United States Patent [19]

Yoon

[11] Patent Number: 4,563,363

[45] Date of Patent: Jan. 7, 1986

[54] METHOD FOR MANUFACTURING A JELLY CONFECTIONERY COATED WITH CHOCOLATE

[75] Inventor: Young-No Yoon, Seoul, Rep. of Korea

[73] Assignee: Crown Confectionery Co., Seoul, Rep. of Korea

[21] Appl. No.: 526,291

[22] Filed: Aug. 25, 1983

[30] Foreign Application Priority Data

Aug. 31, 1982 [KR] Rep. of Korea ............... 3916/1982
Sep. 29, 1982 [KR] Rep. of Korea ............... 7704/1982

[51] Int. Cl.⁴ .................. A21D 15/08; A23G 3/00
[52] U.S. Cl. ................................ 426/303; 426/94; 426/305; 426/306
[58] Field of Search ............... 426/89, 94, 98, 103, 426/302, 303, 305, 306, 577, 810

[56] References Cited

U.S. PATENT DOCUMENTS 2,851,365  9/1958  Perrozzi ..................... 426/103
3,814,819  6/1974  Morgan ...................... 426/89
4,401,681  8/1983  Dahle ....................... 426/94

FOREIGN PATENT DOCUMENTS 46-22541  6/1971  Japan ....................... 426/306
47-14365  8/1972  Japan ....................... 426/94
51-15102  5/1976  Japan ....................... 426/103

Primary Examiner—George Yeung
Attorney, Agent, or Firm—Cushman, Darby & Cushman

[57] ABSTRACT

A novel structural jelly confectionery product is provided. This confectionery product is prepared by providing a jelly having a lower level of sugar content, enrobing a baked biscuit with said jelly and then coating the enrobed product with chocolate.

7 Claims, 2 Drawing Figures

METHOD FOR MANUFACTURING A JELLY CONFECTIONERY COATED WITH CHOCOLATE

FIELD OF THE INVENTION

The present invention relates to a novel method for manufacturing a jelly confectionery and more particularly to a jelly confectinery coated with chocolate.

BACKGROUND OF THE INVENTION

In prior art processes by biscuit products such as pies, these products were prepared by either center-filling a cream, jam, marsh mallow or other moisturizing fillers between two pieces of biscuits so that free water contained in such fillers is moved into the biscuits which had been baked by a mechanical processing through a water storage tank by means of a conveyor belt in order that water is absorbed into the biscuits and then coating the outward surfaces of the biscuits with a certain nutritive material. However, in such prior art products, there have been found the following drawbacks:

1. When a filler such for example as a cream, jam, marsh mallow or the like, free water in such a filler is not evenly contained throughout the filler and, therefore, the movement of the moisture into the biscuit body is not effected uniformly; thereby it is difficult to homogeneously supply the moisture to the entire biscuit body. As a consequence, it is impossible to prevent the resultant product from being partially crumbled and/or hardened. Further, since the filler is placed in the central inner space defined between two pieces of biscuits, the outward surfaces of the biscuits become harder; this would cause the quality of the product lowered; and
2. In a process in which the biscuits are moisturized by a mechanical processing, the process was suffered from a rise of the production costs in the aspects of the installation as well as the operation conditions.

Thus, in the art, there has long been desired an appearance of a novel confectionery in which the aforementioned prior art darwbacks have effectively been eliminated.

SUMMARY OF THE INVENTION

The primary object of the invention is to provide a new type of jelly confectionery which has eliminated all of the problems which were mainly encountered with conventional pies.

Another object of the invention is to provide a new type of jelly confectionery having an even moisture content and thus a good storage stability.

Still another object of the invention is to provide a novel jelly confectionery which would never be partially crumbled and hardened.

Further still object of the invention is to provide a high grade and nutritive jelly confectionery product.

Another object of the invention is to provide a jelly confectionery having a peculiar tissue structure composed of a jelly and a nutritive layers around the outward surfaces of the core biscuit or biscuits.

These and other objects of the invention can be attained by the method according to the invention, which method comprises: first enrobing the outward surfaces of a piece of biscuit with a jelly having a lower level of sugar content; passing the resultant enrobed biscuit through a cooling tunnel maintained at a temperature ranging from $-10°$ C. to $+10°$ C. to cool said biscuit; drying said cooled biscuit to a certain moisture level; and then coating the surfaces of the resulting product with a nutrient by a conventional means.

The term "a jelly having a lower level of sugar content" used herein means a jelly containing less than 75° Brix sugar. This type of jelly may be prepared by a variety of methods. For instance, an agar-based jelly is prepared by soaking 1% to 5% by wight of agar in 10 times of distilled water, allowing the mixture to stand for 4 to 5 hours so that water is sufficiently absorbed into the agar, heating the mixture in a steam jacket to dissolve the agar, adding thereto 50% to 95% by weight of sugar, heating again the mixture to 100° C. to 107° C. to obtain a sugar mixture, and cooling the last resultant mixture in a separate vessel. A pectin-based jelly is obtained by the following procedures: A mixture of water (20 to 30 wt.% based on the total weight of the final product) and citric acid (0.2 to 0.5 wt.% based on the total weight of the final product) is heated 80° C. to 100° C. Thereto, 2% to 5% by weight of pectin and 7% to 10% by weight of sugar are admixed with stirring to thoroughly dissolve the components. Thereafter, 50% to 80% by weight of additional sugar is added to the dissolved mixture which is heated to 100° C. to 107° C. and concentrated and dried to give a final pectin jelly product.

With one of the jellies thus prepared, biscuits or sandwich biscuits which have been baked and then laid on a wire conveyor belt are thoroughly enrobed around their outward surfaces in accordance with the invention. Thereafter, the biscuits thus enrobed are passed through a cooling tunnel maintained at $-10°$ C. to $+10°$ C. for 10 to 30 minutes, so that the enrobed products are cooled evenly to a certain temperature throughout both the inside and the outside thereof. And, then, the products are passed again through a drying chamber at 30° C. to 40° C. to dry the products sufficiently. These dry products are further passed through a conventional apparatus for coating a nutrient such as chocolate on a confectionery in order to form a chocolate layer on the enrobed jelly layer. The invention is completed by passing the coated products through a cooling tunnel at 4° C. to 9° C. for about 3 minutes in order to cool and age them after the completion of the coating process.

As mentioned in the earlier part of the invention, agar- and pectin-based jellies each were referred to as those having a lower level of sugar appropriate to practice the invention; however, it should be understood that the invention will not be limited to only such jellies. Carageenan, Arabic gum, carboxymethyl cellulose (CMC), sodium arginate, gelatine or the like may also be used as those materails producing an effect equal to that of the agar- and/or pectin-based jelly, but it has been discovered that the materials other than Carageenan are inappropriate as enrobing materails in view of various experimental tests. In other words, it has been found that in the case of Carageenan, it can be used as a preferred enrobing material by virtue of its lower voscosity after its jellification as well as its good resilient properties after its cooling and drying. The preparation of a Carageenan jelly may be based on that of a pectin jelly, except that the amount of the Carageenan to be used ranges from ¼ to 1/10 of of that of the pectin. However, the viscosity of other materials than Carageenan is too high to use them as enrobing materials. Those materials are very poor in view of their resilient properties and, thus, they cannot afford a soft gummy taste to the confectionery involved and are poor in the capability of transferring free moisture into the inner portion of the confectionery. Therefore, it is not recommandable that those materials be employed as enrobing materials and/or components. Particularly, gelatine has a severe drawback in that it will not gellate simply during the course of preparing a jelly therefrom.

In the meanwhile, the rate of movement of free water from a jelly layer into the biscuit body in a confectionery product in which the jelly is enrobed around the biscuit is a linear function of the moisture and the sugar contents of the jelly used. That is, in a confectionery product enrobed with a jelly having a higher level of sugar content, free water from the jelly will not be transferred easily into the inner structure of the biscuit and, therefore, it will take an extended period of time to obtain a a product having a soft tissue structure.

In general, it is most preferred to use a resilient jelly as an enrobing material in practicing the invention. It also is possible to either apply the jelly around the surfaces of a biscuit and/or sandwich biscuit in other appropriate manners than those described in connection with the invention or subject the jelly to center-filling between two pieces of biscuits (so that the jelly is sandwiched between the biscuits); however, in the latter case, it is difficult to yield a confectionery product with a soft homogeneous tissue structure.

BRIEF DESCRIPTION OF THE DRAWINGS

The invention will further be illustrated by means of the accompanying drawings, wherein.

DETAILED DESCRIPTION OF THE INVENTION

Figure 1:
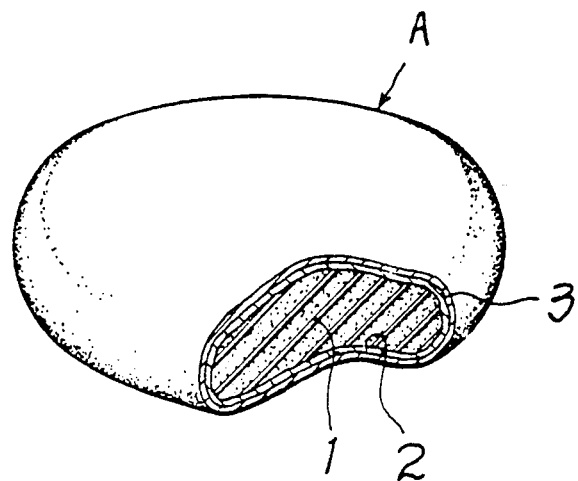
FIG. 1 shows a perspective view of a jelly confectionery product in accordance with the invention, which is partially cut away.

Referring now to FIG. 1, the confectionery product depicted by a symbol A has two layers around a biscuit 1: one is an inner resilient jelly layer 2 which is formed by enrobing a jelly around the outward surfaces of the biscuit 1; and the other is an outer layer 3 which is formed by coating a nutrient on the jelly layer 2.

Figure 2:
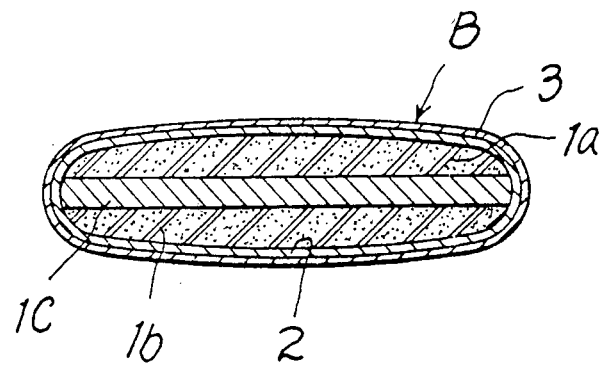
FIG. 2 shows a sectional view of another jelly confectionery product in accordance with the invention.

FIG. 2 embodies another jely confectionery B in accordance with the invention, in which a pair of biscuits 1a and 1b, instead of a single piece of biscuit 1 as shown in FIG. 1, are configurated. Between the two biscuits 1a and 1b, a filling material 1c such, for example, as a cream, jam, marsh mallow or the like is inserted or sandwiched.

The advantageous effects of the invention will be discussed hereinbelow with reference to the drawings mentioned above.

Since the entire sufaces of the jelly confectionery product A or B in accordance with the invention is primarily enrobed with a jelly having a lower level of sugar content to form a jelly-enrobed layer 2 on the core biscuit 1, and secondarily coated with chocolate on the layer 2 to form a chocolate layer 3, permeability of air into the confectionery product A or B from atmosphere is so low to the extent of an approximate zero point. Furthermore, since a fine space of an air layer is defined between the jelly layer 2 and the chocolate layer 3, heat conduction into the inside of the confectionery from the outside thereof cannot be effected; thereby the confectionery will not be affected by but becomes stable to changes in an ambient temperature.

In addition, the confectionery product of the invention is further characterized in that upon being exposed to atmospheric storage and/or transportation conditions, it expands and contracts uniformly. Accordingly, the nutrient component such as the chocolate coated on the jelly layer will not be crumbled or crushed.

Further, in accordance with the invention, it is possible to obtain a jelly confectionery product having soft gummy taste; this will cause an increase in one's appetite. In the case of a sandwich biscuit, it is possible to simulataneously have the sandwiched cream, jam or marsh mallow, the enrobed jelly, and the coated chocolate and, thus, the product is valuable as a nourishing cofectionery.

The invention will further be illustrated by the following non-limiting examples.

PREPARATION EXAMPLE 1

Raw materials were admixed in the following composition in accordance with the manner described below:

| Sugar | 60.0 grs. |
|---|---|
| Starch syrup | 20.5 grs. |
| Fructose | 17.1 grs. |
| Agar | 2.4 grs. |

Agar was soaked in water for a time sufficient to completely hydrate and dissolve it and, then, thereto sugar, starch syrup and fructose were added in order. The resulting agar jelly was heated to 104° C. and the moisture content of the jelly was controlled to 30.5% (sugar level 69.5° Brix). Then, the jelly was cooled 75° C. and sprayed on a baked biscuit, whereupon the viscosity of the jelly was 1.8 poise at the operation condition and 3.8 poise at 70° C., respectively. After cooling, the hardeness of the jelly was shown as 980 grs./cm$^2$ when detected by a jelly hardness detector.

PREPARATION EXAMPLE 2

Raw materials were admixed in the following composition in accordance with the manner described below:

| Citric acid | 0.3 Kgrs. |
|---|---|
| Pectin | 3 Kgrs. |
| Finely powdered sugar | 7 Kgrs. |
| Sugar | 60 Kgrs. |
| Starch syrup | 31 Kgrs. |

The mixture was prepared by first dissolving citric acid in Water and then following the procedure similar to that described in Preparation Example 1 above.

The resulting pectin jelly had viscosities of 2.7 poise at 80° C. and 4.2 poise at 70° C., and a hardness of 222 grs./cm$^2$ as determined by a jelly hardness detector.

PREPARATION EXAMPLE 3

Raw materials were admixed in the following composition in accordance with the manner described below:

| Carageenan | 0.58 Kgrs. |
|---|---|
| Finely powdered sugar | 5.81 Kgrs. |
| Sugar | 55.23 Kgrs. |

-continued

| | |
|---|---|
| Starch syrup | 20.93 Kgrs. |
| Fructose | 17.44 Kgrs. |

Following the procedures similar to those described in Preparation Examples 1 and 2, there was obtained a Carageenan jelly with a moisture content of 30.5% (at 104° C.), viscosities of 2.5 poise at 80° C. and 5.5. poise at 70° C., and a hardeness of 70 grs./cm$^2$.

EXAMPLE 1

The agar-based jelly which has been prepared in accordance with Preparation Example 1 was placed in a jelly spraying tank. The temperature of the jelly was controlled to 75° C. so that the jelly had a viscosity of 2.0 poise. Thereafter, the jelly eas sprayed on two pieces of biscuits between which marsh mallow was sandwhiched. The biscuit thus enrobed with the jelly was passed through a cooling tunnel maintained at 5° C. for 10 minutes and, then, the difference in the temperature of the inside and the outside of the jelly was maintained constantly. Thereafter, the biscuit was passed in a cooling chamber at 35° C. so that the temperature of the biscuit could be maintained constantly.

The resulting dry confectionery product was coated with chocolate by means of a conventional chocolate-coating apparatus and, then, passed through a cooling tunnel at 7° C.

EXAMPLE 2

The pectin jelly which has been prepared in accordance with Preparation Example 2 was introduced into a jelly spraying tank. The temperature of the jelly was controlled to 80° C. so that the jelly had a viscosity of 2.7 poise. Thereafter, the jelly was sparyed on the surfaces of two pieces of biscuits between which marsh mallow was sandwiched. The biscuit thus enrobed with the jelly was passed through a cooling tunnel maintained at +10° C. for 10 minutes and, then, the difference in the temperatures of the inside and the outside of the jelly layer was maintained constantly. Thereafter, the biscuit was passed in a cooling chamber at 30° C. so that the temperaure of the biscuit could be maintained constantly.

The resulting dry product was coated with chocolate by means of conventional chocolate-coating apparatus and then, passed through a cooling tunnel at 7° C.

EXAMPLE 3

The Carageenan jelly which has been prepared in accordance with Preparation Example 3 was introduced into a jelly spraying tank. The temperature of the jelly was controlled to 80° C. so that the jelly had a viscosity of 2.5 poise. Thereafter, the jelly was sprayed on the surfaces of two pieces of biscuits between which marsh mallow was sandwiched. The biscuit thus enrobed with the jelly was passed through a cooling tunnel maintained at +5° C. for 10 minutes and, then, the difference in the temperatures of the inside and the outside of the jelly was maintained constantly. Thereafter, the biscuit was passed through a cooling chamber at 35° C. so that the temperature of the biscuit could be maintained constantly.

The resulting product was coated with chocolate by means of a con conventional chocolate-coating apparatus and, then, passed through a cooling tunnel at 7° C.

EXPERIMENTAL EXAMPLE 1

Ten samples each were randomly taken from the confectionery products manufactured in examples aforementioned (products of the invention) and from the prior art pies which were prepared by coating a single or a sandwiched biscuit with only chocolate (products of the prior art).

Changes in the moisture contents of the main components with time of both products were detected at room temperature (15° C.) after standing for 24, 48 and 60 hours, respectively.

The results are represented in TABLE I below.

TABLE I

| | CHANGES IN MOISTURE CONTENTS OF THE MAIN COMPONENTS | | | | | | |
|---|---|---|---|---|---|---|---|
| | Initial Moisture | Products of the invention | | | Products of the prior art | | |
| Components | Content (%) | After 24 hrs | After 48 hrs | After 60 hrs | After 24 hrs | After 48 hrs | After 60 hrs |
| Jelly | 32 | 22.6 | 18.32 | 17.02 | — | — | — |
| Biscuit | 2.84 | 8.37 | 11.54 | 13.5 | 6.63 | 8.72 | 9.06 |
| Marshmallow | 24 | 18.32 | 15.38 | 14.93 | 17.65 | 12.82 | 11.07 |

EXPERIMENTAL EXAMPLE 2

Comparison tests were conducted using the same samples as in Experimental Example 1 on their physical properties, except that they were allowed to stand for at least 60 hours prior to the tests.

The results are shown in TABLE II below.

TABLE II

| COMPARISION OF PHYSICAL PROPERTIES | | |
|---|---|---|
| Comparison Items | Products of the Invention | Products of the Prior Art |
| Change in Tissue Structure | no partial crumbling and/or hardening were found | Partial crumbling and/or hardening were found. |
| Dry Tendency in Atmosphere | Slow | Rapid |
| Feeling on Tissue Structure | Moist and soft | Outer surface is crackly and inside is moist |
| Hardness | 451 grs./cm$^2$ | 779 grs./cm$^2$ |
| Marsh Mallow | Remains soft | Becomes hard and tough |

What is claimed is:

1. A method for manufacturing a jelly confectionery product which comprises:
   providing a jelly containing less than 75° Brix sugar;
   enrobing the outward surfaces of a baked biscuit with said jelly;
   passing the resultant enrobed biscuit through a cooling tunnel maintained at a temperature ranging from −10° C. to +10° C. to cool said enrobed product;

drying said cooled product to a temperature ranging from 30° C. to 40° C.; and coating the surfaces of the resulting dried product with a nutrient material whereby the jelly functions as a layer for maintaining an even moisture content in the interior of said baked biscuit.

2. The method as claimed in claim 1, wherein said biscuit is of a single piece.

3. The method as claimed in claim 1, wherein said jelly is selected from the group consisting of an agar-, pectin- and Carageenan-based jellies.

4. The method as claimed in claim 1, wherein said coated product is further passed through a cooling chamber maintained at +4° C. to +9° C.

5. The method as claimed in claim 2, wherein said coated product is further passed through a cooling chamber maintained at +4° C. to +9° C.

6. The method as claimed in claim 3, wherein said coated product is further passed through a cooling chamber maintained at +4° C. to +9° C.

7. The method as claimed in claim 1, wherein said nutrient material is chocolate.

* * * * *